April 22, 1941. J. A. SPENCER 2,239,541
TEMPERATURE RESPONSIVE APPARATUS
Filed Nov. 23, 1938 2 Sheets-Sheet 1

John A. Spencer,
Inventor,
Haynes, Koenig and Wolf,
Attorneys.

April 22, 1941.   J. A. SPENCER   2,239,541
TEMPERATURE RESPONSIVE APPARATUS
Filed Nov. 23, 1938   2 Sheets-Sheet 2
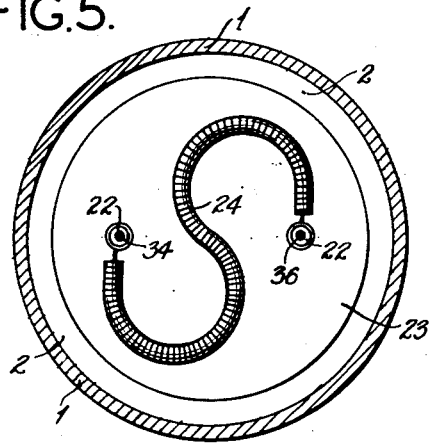
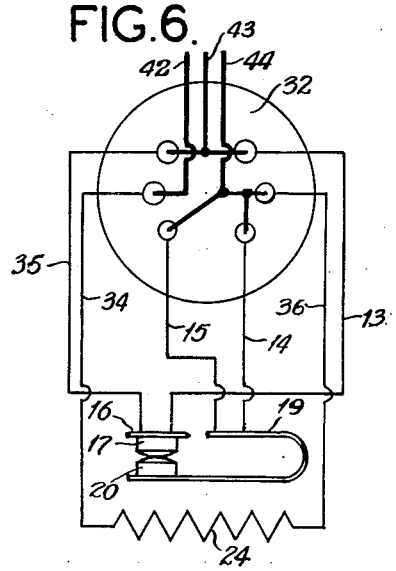
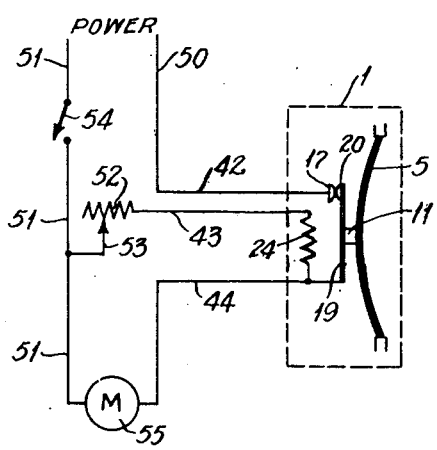
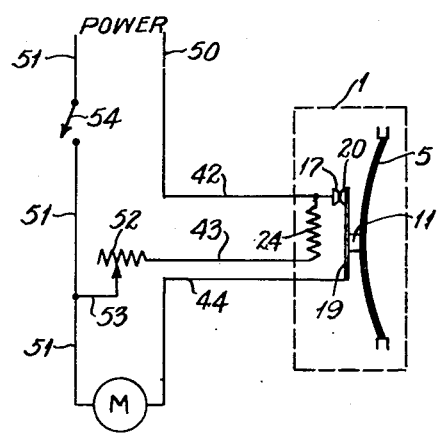
John A. Spencer,
Inventor,
Haynes, Koenig and Wolf,
Attorneys.

Patented Apr. 22, 1941

2,239,541

UNITED STATES PATENT OFFICE 2,239,541

TEMPERATURE RESPONSIVE APPARATUS

John A. Spencer, Newtonville, Mass., assignor to Metals & Controls Corporation, Attleboro, Mass., a corporation of Massachusetts Application November 23, 1938, Serial No. 242,059

4 Claims. (Cl. 200—122)

The invention relates to temperature responsive apparatus, and with regard to certain more specific features, to temperature responsive electric switches.

Among the several objects of the invention may be noted the provision of a temperature responsive apparatus the functional parts of which are enclosed in hermetically sealed means such that the switch as a whole is adapted for use in connection with corrosive or otherwise deleterious surrounding media, such as for use in refrigerating apparatus; the provision of temperature responsive apparatus of the class described which is provided with means for adjusting the effective response temperature, which adjusting means is effective within the hermetically sealed region on the elements therein, but does not include any mechanically movable parts extending through the confines of said region; the provision, in temperature responsive apparatus of the class described, of means entirely operative through electrical circuits for varying the effective temperature response characteristics of the device; the provision of temperature responsive apparatus of the class described which includes means for changing the effective temperature response characteristics of the apparatus operative from remote locations; and the provision of temperature responsive apparatus of the class described which is relatively simple and economical in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention—

Figure 1:
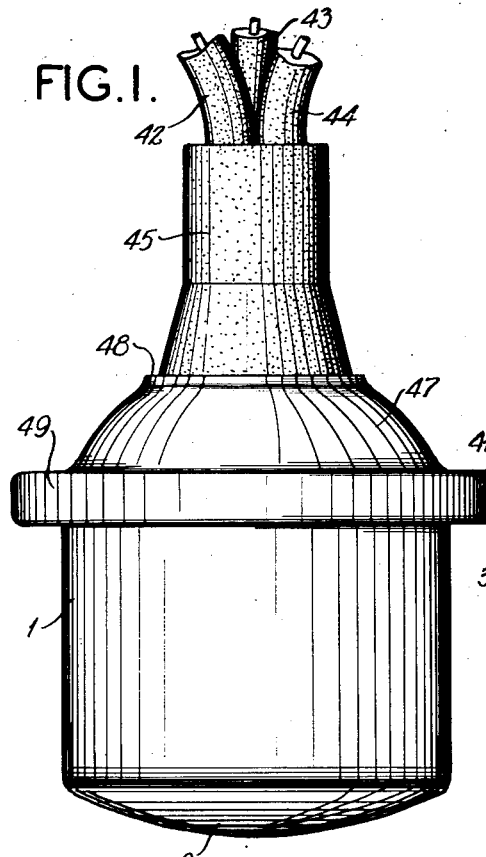
Fig. 1 is a side elevation of a temperature responsive electric switch made in accordance with the present invention.
Figure 2:
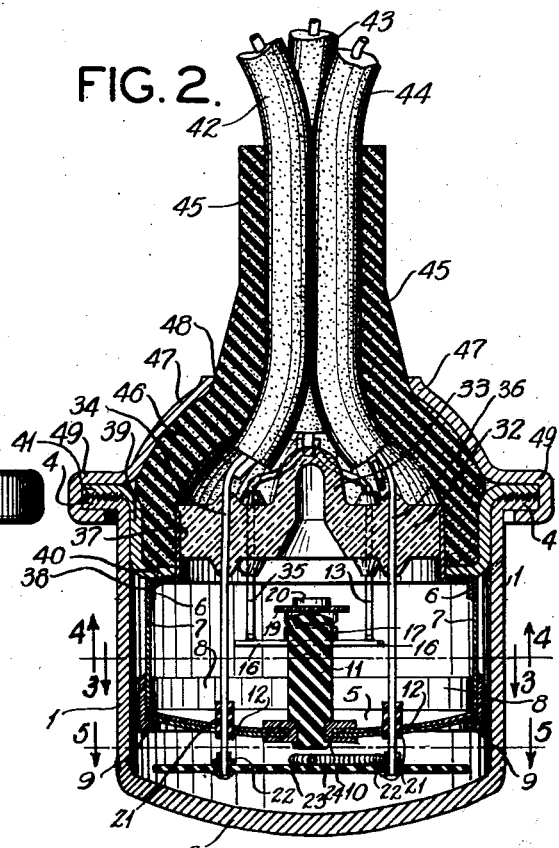
Fig. 2 is an axial section of the switch of Fig. 1.
Figure 3:
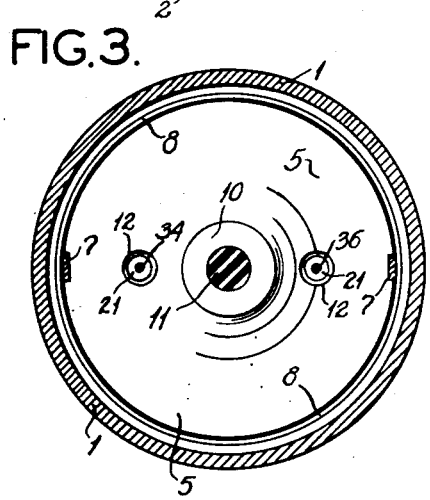
Figure 4:
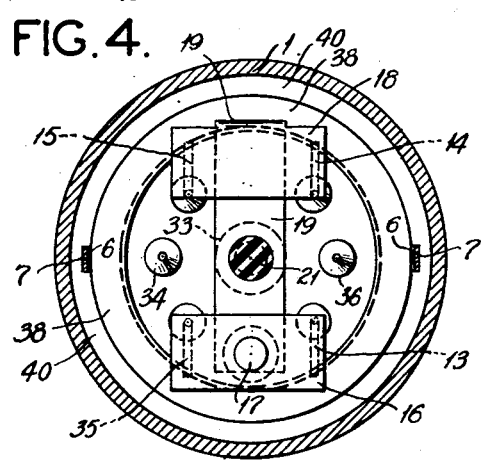

Figs. 3, 4 and 5 are cross sections taken substantially along lines 3—3, 4—4 and 5—5, respectively, of Fig. 2;

Fig. 6 is a diagram illustrating certain electrical connections within the switch of Fig. 1; and, Figs. 7 and 8 are electric circuit diagrams illustrating certain alternative uses of the switch of Figures 1 and 2.

Similar reference characters indicate corresponding parts throughout the several views of the drawings.

In the copending application of John A. Spencer, Serial No. 60,987, filed January 27, 1936, there is described and claimed a thermostatic electric switch which is particularly adapted for use in corrosive or otherwise deleterious atmospheres. A principal feature of the device therein described and claimed is that all of the functional or moving elements thereof are encased within a hermetically sealed envelope made of highly thermally conductive material, such as a suitable metal. One of these principal objects of the present invention is to provide a temperature responsive device of the same general type as that shown in the said Spencer application, but of simplified construction and operation. However, another purpose of the present invention, probably of relatively greater importance, is to provide improved means for adjusting the effective operating temperature of the thermostatic means within the envelope as related to the ambient temperature to which the device as a whole is subjected. In the present invention, such adjusting means are provided in a manner that requires no mechanical movement whatsoever through the walls of the envelope itself. That is to say, with the present invention no part of the hermetically sealed envelope in which the temperature responsive elements are enclosed need itself be flexible, in order to permit a movement of the type ordinarily connected with the adjustment of the operating temperatures of thermostats.

Referring now more particularly to Fig. 1, numeral 1 indicates a cup-like casing or shell having a constricted lower or closed end indicated by numeral 2. At its upper, or open, end, the shell 1 is provided with an outwardly turned, flat flange 4. The shell 1 is preferably made of a corrosion-resistant material such as stainless steel, for example.

Numeral 39 indicates a metal ring or sleeve that slides in and fits snugly to the inner wall of shell 1. At its lower end, the ring 39 has an inwardly turned flange 40, to which an outwardly turned flange 38 of a metallic ring 37 is welded or soldered in a hermetic seal. At its upper end, the ring 39 has an outwardly turned flange 41, which fits against, and is securely welded or soldered or otherwise sealed to, the outwardly turned upper flange 4 of shell 1.

At diametrically opposite points on the periphery of flange 38 of ring 37, tabs 6 are provided, which are bent downwardly as shown. To tabs 6 are welded or otherwise affixed the ends of two supporting strips 7. The other ends of strips 7 are welded or otherwise affixed to the inner surface of a ring 8, which is only slightly less in external diameter than the internal diameter of shell 1. At its end opposite the strips 7, the ring 8 is provided with an internal annular shoulder 9.

Resting on the shoulder 9 is the outer periphery of a thermostat 5, which is preferably a snap-acting dished thermostatic metal disc of the type shown in John A. Spencer Patent 1,448,240 (as shown in Fig. 2), or alternatively of the type shown in John A. Spencer Patent 1,895,591. It will be understood, however, that other thermostatic devices may be substituted for the disc 5.

The thermostatic disc 5 is held in place against the shoulder 9 by the ends of the two strips 7. The spacing of these strip ends with respect to the shoulder 9 is such that the periphery of the thermostatic disc 5 is not tightly bound, but is sufficiently great that said disc 5 can freely snap, in response to temperature changes, between an upwardly concave position, as shown in Fig. 2, and an oppositely-facing downwardly concave position.

Thermostatic disc 5 is centrally perforated and through the perforation is clamped a hollow rivet or hub member 10. Securely fastened in the center of hub 10 is an upwardly-extending pin 11 of material (such as "Bakelite," for example) of poor heat conductivity. Disc 5 also has intermediate, diametrically opposite holes 12 therein for purposes to be described.

Numeral 32 indicates a disc or header plate of electrical insulation material, preferably glass, that is of somewhat less diameter than the internal diameter of shell 1. Near its center, the header 32 is provided with an originally cylindrical, upstanding nipple 33. Passing through the header disc 32, and sealed therein, are six lead-in wires 13, 14, 15, 34, 35, and 36 (see also Fig. 4). The header 32 and the wires passing therethrough constitute a regular construction in the radio tube art.

The outer periphery of header 32 is hermetically sealed to the inner periphery of metallic ring 37. The metal of the ring 37, and of the wires 13, 14, 15, 34, 35, and 36, is a suitable type, such as the well-known alloy of iron, cobalt, and nickel, that is capable of making a hermetic seal to glass.

The ends of wires 35 and 13 are bent at right angles shortly beneath the header 32 to support a rectangular plate 16 of metal, which is soldered or welded thereto. Plate 16 carries thereon an upwardly-facing electrical contact button 17 preferably made from or at least surfaced with a metal of high electrical conductivity, such as silver.

The ends of wires 14 and 15 are similarly bent at right angles shortly beneath the header 32 to support a rectangular plate 18 having a long rectangular projection 19 extending from the outside thereof. Projection 19, at its line of emergence from plate 18, is bent towards header 32, and then backwardly, parallel to plate 18, and extending diametrically across the assembly. Projection 19 is made of a springy material, such as phosphor bronze, and carries at its free end an electrical contact button 20 facing downwardly to engage button 17 on plate 16. Projection 19, hereinafter referred to as a spring arm, normally urges buttons 17 and 20 together to make electrical conduction between wires 35 and 13, on the one hand, and wires 14 and 15, on the other hand. Pin 11, when disc 5 is upwardly concave, either just barely touches or is spaced from spring arm 19, but when disc 5 changes to its downwardly concave position, the end of pin 11 bears against spring arm 19 and thus disengages contact 20 from contact 17.

The wires 34 and 36 pass through holes 12 in disc 5, and are electrically insulated from disc 5 by insulating material collars 21 mounted thereon. Below disc 5 wires 34 and 36 are welded or soldered to hollow rivets 22 which are clamped through a disc-shaped piece of material 23 of good heat and electrical insulative qualities, mica being presently preferred for the material.

Disc 23 has cemented thereto, on the side facing the thermostatic disc an S-shaped (other shapes without number may be used) electrical resistance heating element 24, the ends of which are electrically connected to the rivets 22 and thus to wires 34 and 36.

By reason of the hermetic seal between header disc 32 and ring 37, the hermetic seal between rings 37 and 39, and the hermetic seal between ring 39 and shell 1, it will readily be seen that the inside of shell 1, after the nipple 33 has been sealed off, is hermetically sealed with respect to the exterior thereof, albeit electrical connections are provided through wires 13, 14, 15, 34, 35 and 36 passing through header disc 32. Before the nipple 33 is sealed off, however, it is usually desirable that the shell 1 be evacuated and then refilled with a gas having a high heat conductivity, such as hydrogen or helium.

Numerals 42, 43 and 44 indicate suitably insulated external connection wires. Wire 42 is connected to lead-in wire 34, wire 43 to lead-in wires 13 and 35, and wire 44 to lead-in wires 14, 15, and 36, all atop the glass header disc 32. Surrounding the ends of wires 42, 43 and 44 is a soft rubber or like material sleeve 45, which terminates as a hemispherical portion 46. The lower extremity of the hemispherical portion 46 is received in a channel or groove formed between the inner surface of ring 39 and the outer surface of ring 37, as illustrated in Fig. 2.

Numeral 47 indicates a generally hemispherical cap provided at its upper edge with an opening 48 for passing the rubber sleeve 45, and at its lower end with a flange 49 which, in assembly, is turned under the welded-together flanges 41 and 47 to clamp the same together. In the course of such clamping, the hemispherical portion 46 of rubber sleeve 45 is forced tightly into the aforementioned grooves between rings 37 and 39, and the cylindrical upper portion of the rubber sleeve is forced tightly around wires 42, 43 and 44, thus tending to seal off the region above the header 32 from the outside atmosphere. It is to be realized, however, that there is not the same necessity for hermetically sealing off this region atop the header 32, as there is for the region inside the shell 1. In other words, while the region above the header 32 is preferably sealed, it need not be hermetically sealed like the region below said header in the shell 1.

The electrical connections within the hermetically sealed portion of shell 1 are made clear in Fig. 6, to which reference is now directed. It will clearly be seen that wire 44 is a common connection for both heater 24 and the movable contact 20 on spring arm 19. The wire 42, on the other hand, connects only the other end of the heater element 24, while the wire 43 connects only the stationary contact 17. A three wire connection is thus provided to the switching elements and the heater, by which either may be controlled independently of the other.

The manner of use of a device as thus described is best indicated by reference to one of the circuits in which it can be connected, such as the one shown in Fig. 7. It will be seen that wire 42, which affords a common connection for both one side of the heater 24 and the stationary contact 17, is connected to one wire 50 of a pair of power wires 50 and 51. Wire 43, which is connected to the other end of heater 24, goes to a rheostat or other current controlling device 52, the other connection 53 of which is connected to power wire 51. An off-and-on switch 54 is interposed in the power wire 51. Wire 44, which connects to the movable contact 20, goes to one side of a motor, the other side of which is connected directly to the power wire 51. It will thus be seen that the motor and the thermostatically actuated switch comprising contacts 17 and 20 are connected in series across the power wires 50 and 51, while heater 24 and rheostat 52 are similarly connected in series across the power wires 50 and 51. Rheostat 52, as well as the motor, it will be understood, can be readily installed at a location remote from the temperature responsive device itself.

The operation of the device in a circuit as thus described is as follows:

Assume, first, that the device as a whole is mounted in a refrigerator, refrigerated showcase, or like location, to control the temperature thereof. The motor constitutes the means, such as the motor of the compressor circuit of the refrigerator, or a relay controlling the operation of such a motor, by which the temperature conditions within the refrigerator are actually varied. Assume also that the thermostatic disc is of such a type, that, on rise of temperature to a value such as 30° F., it snaps from its downwardly concave to its upwardly concave position (shown in Fig. 2) to permit spring arm 19 to bring movable contact 20 into electrical connection with stationary contact 17, and that on fall of temperature to a value of, say, 20° F., it snaps from upwardly concave position to downwardly concave position, thus causing pin 11 to react against spring arm 19 to lift movable contact 20 from stationary contact 17. It will accordingly be seen that at all temperatures above 30°, the electric switch comprising the contacts 17 and 20 is closed to actuate the motor 55, while at all temperatures below 20° the electric switch is open to deenergize said motor 55. At temperatures between 20° and 30° the condition of the switch depends upon the phase of the device; if the refrigerator is cooling, the switch is closed and the motor is going, while if the refrigerator is heating, the switch is open and the motor is disconnected.

The effect of the heater 24 upon the operation of the thermostatic disc 5 will now be considered. Assume that the rheostat 52 is adjusted so that the current flowing through the heater 24 is just sufficient to maintain the interior of shell 1 at a temperature 5° above the ambient, or refrigerator temperature. In other words, when the refrigerator temperature is 20°, the temperature within the shell 1, which temperature directly affects the thermostatic disc 5, is 25° F. It will now be seen that the effective operating range of temperatures within the refrigerator will be lowered by a 5° increment. That is to say, the disc 5 will bring the motor 55 into operation when the temperature within the shell 1 is 30° (as heretofore), but this means that the temperature of the refrigerator is but 25°; and similarly, the thermostat 5 will disconnect the motor 55 when the temperature within the shell 1 is 20° (as heretofore), but this means that the temperature of the refrigerator will be 15°. The operating range of temperatures of the refrigerator is thus lowered to 15° to 25°, instead of 20° to 30°, even though the immediate ambient limiting temperatures directly affecting the operation of the thermostatic disc 5 still are 20° and 30°.

Adjustment of the rheostat 52 to provide a greater or less heating effect for the heating element 24 thus provides an effective control of the operating range of temperatures of the refrigerator. If, for example, the heater 24 be arranged to supply a 10° increment of heat in the shell 1, then the operating range of the refrigerator will be 10 to 20°, while if the heater element 24 is arranged to supply a mere 1° increment in temperature in the shell 1, the operating range of the refrigerator will be 19 to 29°.

It will be noted in connection with the circuit shown in Fig. 7 that the heating element 24 is connected through its rheostat 52 so as to be constantly operated, provided that the main switch 54 is closed. The consequence is that the operating differential (e. g., the difference in temperature between the upper and lower limiting operating values), will be kept constant regardless of the variations in the response itself. In the foregoing example, it will be recalled that a difference of 10° existed between the operating temperatures of the thermostat 5 regardless of whether the refrigerator was being operated between relatively lower or higher temperature limits. Fig. 8 shows an alternative circuit arrangement whereby this operating differential, as well as the operating range, may be varied through controlled use of the heater 24.

Referring to Fig. 8, it will be seen that the inner end of heater 24 instead of being connected to fixed contact 17, is now connected to movable contact 20. The other connections, however, are the same. This means that the thermostatic electric switch, represented by contacts 17 and 20, is now connected in series with the power supply to both motor 55 and heater element 24, and consequently that heater element 24 operates only when motor 55 itself is operating. Assuming the device to be installed in a refrigerator as heretofore described, and the inherent (no heater 24) limiting operating temperatures of the disc 5 to be 20° and 30°, as heretofore, it will be seen that the upper limiting value, 30°, is not now affected by the heater 24 in any event, because the thermostatic disc 5 always reaches said value 30° in a heating phase during which the motor 55 and heater element 24 are not operating. Regardless of the adjustment of the rheostat 52, therefore, the thermostatic electric switch always closes when the refrigerator temperature reaches 30°.

As soon as the switch closes the circuit, however, to commence the operation of the motor 55 and heating element 24 (e. g., the refrigerator goes into a cooling phase), the heater 24 comes into operation to prevent the thermostatic disc 5 from cooling down as fast as the refrigerator itself is cooling as a result of the operation of the motor 55. If the rheostat 52 is adjusted as heretofore, so that the heater element 24 supplies a 5° temperature increment to the shell 1, this means that the refrigerator temperature will be obliged to drop to a value of 15° before the interior of the shell 1 reaches a temperature of 20°, to cause the thermostatic disc 5 to snap to open its switch. Similarly, if the rheostat 52 were adjusted so that the heater 24 supplied a 10° increment to the shell 1, then the refrigerator would have to drop to 10° before the interior of the shell 1 reached 20° and thus caused the disc 5 to snap to open the switch, and if the rheostat 52 were set for a 1° increment, then, by similar reasoning, the refrigerator would have to drop to a temperature of 19° before the switch would be open.

It is accordingly seen that with the circuit shown in Fig. 8, the operating differential of the refrigerator, or range between its operating temperatures, is varied, retaining, however, the upper limiting value unchanged throughout variations of the lower limiting value.

While the device has been described in operation in connection with a refrigerating device, in which it controls the operation of a heat abstracting system (represented by the motor 55), it may similarly be used to control the operation of a heat delivering device, such as an oil burner or other type of heater, which can again be represented by the motor 55. The only change that need be made in this case is that the disc 5 will be inverted in the shell 1 relative to its former position, so that at the termination of a cooling phase it will move to a circuit-making condition instead of a circuit-breaking condition, and conversely upon the termination of a heating phase it will move to a circuit-breaking instead of a circuit-making condition.

In such an arrangement, the device, if connected in a circuit such as shown in Fig. 7, will maintain a constant operating differential, the range of operation, as a whole, being variable in accordance with the adjustment of rheostat 52. With the circuit of Fig. 8 under such conditions, the effect of the heating element 24 will be to proportionately narrow the operating temperature differential, maintaining relatively constant the lower (instead of the upper) limiting value.

A primary feature of advantage in connection with the device of the present invention is that the rheostat 52, which effectively controls the operating temperature, may be located at a point quite remote from the device itself, and still achieve as accurate a control as if mechanical adjustment, such as variations of displacement, tension and the like, were made to the thermally responsive element 5. This electrical method of controlling the effective temperature response characteristics of the device also makes it possible more completely and accurately to hermetically seal off all of the operating parts of the switching device and thermally responsive device per se, as only three relatively stationary lead-in wires or electrical connections need to be made to the interior of the hermetically sealed region.

It will be evident that many changes can be made in regard to the details of the various elements of the invention without departing from the scope of the invention itself. For example, while it is preferred to use a snap-acting temperature responsive element such as the snap-acting disc 5, relatively slow-acting thermostats may likewise be used; similarly, in place of the resistance wire-type heater element 24, a radiant heater, such as a small electric lamp, may be used within the shell 1. The details of mounting within the shell 1 may of course be varied within wide limits.

It is preferred to make the shell 1 out of a heat conductive material, such as metal, so that the thermally sensitive device within said shell will be more immediately responsive to changes in ambient temperature outside the shell. However, if time lag is of little moment, the shell 1 may be made of a material which is not so perfect a conductor of heat, such as glass, for example.

The use of a relatively poor heat conducting material for the pin 11 is advantageous in that it provides against effective conduction of heat generated in the switching system by the making and breaking of a circuit, to the temperature-sensitive thermostat 5, and thus leaves said thermostat more accurately responsive to the true ambient temperature. The use of hydrogen, helium, or their equivalents as a filling gas for the device provides that the temperature of the thermostat 5 will more quickly equalize with the ambient temperature outside the shell 1.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A thermally responsive device comprising a cup-like metallic shell, a thermostatic electric switch mounted in said shell, an electrically operated heater mounted in said shell, and an electrical insulating material header plate hermetically sealing said shell across the open end thereof, said header plate having electrical connections for the switch and the heater sealed therein, said shell being filled with a gas having a relatively high heat conductivity, whereby ambient temperature changes external to the device are quickly effective on said thermostatic switch.

2. A thermally responsive device comprising a cup-like shell, a thermostatic electric switch mounted in said shell, an electrically operated heater mounted in said shell, and an insulating material header plate hermetically sealing said shell across the open end thereof, said header plate having electrical connections for the switch and the heater sealed therein, said thermostatic electric switch comprising cooperating electrical contacts and temperature sensitive means mechanically connected by a relatively poor heat conductor to at least one of said contacts to actuate the same, said shell being filled with a gas having a relatively high heat conductivity.

3. A thermally responsive device comprising a cup-like metallic shell, a thermostatic electric switch mounted in said shell, said thermostatic electric switch comprising a snap-acting dished thermostatic metal disc, an electrically operated heater mounted in said shell, and an electrical insulating material header plate hermetically sealing said shell across the open end thereof, said header plate having electrical connections for the switch and the heater sealed therein, said shell being filled with a gas having a relatively high heat conductivity, whereby ambient temperature changes external to the device are quickly effective on said thermostatic switch.

4. A thermally responsive device comprising a cup-like shell, a thermostatic electric switch mounted in said shell, said thermostatic electric switch comprising a snap-acting dished thermostatic metal disc, an electrically operated heater mounted in said shell, and an insulating material header plate hermetically sealing said shell across the open end thereof, said header plate having electrical connections for the switch and the heater sealed therein, said thermostatic electric switch comprising cooperating electrical contacts and temperature sensitive means mechanically connected by a relatively poor heat conductor to at least one of said contacts to actuate the same, said shell being filled with a gas having a relatively high heat conductivity.

JOHN A. SPENCER.